United States Patent Office 3,194,817
Patented July 13, 1965

3,194,817
PRODUCTION OF TETRABROMO PHTHALIC ACID ANHYDRIDE
Heinrich Hahn, Cologne-Deutz, Germany, assignor to Chemische Fabrik Kalk G.m.b.H., Cologne-Kalk, Germany
No Drawing. Filed Dec. 26, 1961, Ser. No. 162,271
4 Claims. (Cl. 260—346.3)

The present invention relates to an improved process for the bromination of phthalic acid anhydride to produce the tetrabromo derivative thereof.

The bromination of phthalic acid anhydride in oleum has been known for some time. According to one of the older processes the phthalic acid anhydride is dissolved in sulfuric acid containing about 50% of $SO_3$ at a temperature of 60° C. and bromine then supplied to such solution and the temperature of the reaction mixture thereafter raised to 200° C. After completion of the reaction, the reaction mixture is cooled and the tetrabromo phthalic acid anhydride separated from the mother liquor.

In order to avoid the strong corrosive action of the reaction mixture it has been recommended that the bromination be carried out in a plurality of steps, only a portion of the required bromine being added in each step. A reaction temperature of 70° C. is maintained in the first step and temperatures of 100° C., 130° C. and 170° C. are maintained in the succeeding steps. The energy requirements for this process, however, are high as the reaction mixture must be cooled to room temperature between each step and then be reheated to the temperature required for the next step.

Both above procedures in addition have the common disadvantage that 2 to 4 times the theoretical quantity of bromine and at least 3.5 to 5 times the theoretical quantity of $SO_3$ are required to enable the production of technically interesting yields of tetrabromo phthalic acid anhydride.

In a process which has recently become known the above-mentioned disadvantages of such older processes for the production of tetrabromo phthalic acid anhydride are avoided by carrying out the bromination of phthalic acid anhydride in concentrated sulfuric acid having a 24–65% $SO_3$ content at temperatures between 50 and 100° C. under superatmospheric pressure in a single- or multi-stage process. As the reaction temperatures maintained during this process are substantially below those employed in the prior processes for bromination of phthalic anhydride in sulfuric acid containing $SO_3$, the corrosiveness of the reaction mixture with respect to the reaction vessel is somewhat decreased. The intrinsic advantage of such process is that phthalic acid anhydride can be converted to its tetrabromo derivative with an equivalent quantity of bromine. However, this process still requires use of about 4.8 times the theoretical quantity of $SO_3$.

As operating under pressure in large scale technical reactions of especially corrosive substances always is accompanied with difficulties, it was highly desired that a process be developed for the production of tetrabromo phthalic acid anhydride which could be carried out at atmospheric pressure with good yields of conversion of equivalent or almost equivalent quantities of phthalic acid anhydride and bromine.

The process according to the invention unexpectedly renders it possible to produce tetrabromo phthalic acid anhydride at atmospheric pressures employing approximately equivalent quantities of phthalic acid and bromine. According to such process phthalic acid anhydride is reacted with bromine at an elevated temperature in concentrated sulfuric acid containing 20 to 65% of $SO_3$ in that 4 to 6 g.-atoms (gram-atoms), preferably, 5.2 g.-atoms, of bromine and 0.5 to 3 g.-atoms, preferably, 1.1 g.-atoms, of chlorine per mol of phthalic acid anhydride are simultaneously introduced into the reaction mixture, a slight bromine excess over the chlorine always being maintained during the progress of the bromination.

In carrying out the process according to the invention the phthalic acid anhydride is first dissolved in concentrated sulfuric acid containing 20–65% of $SO_3$ in such quantities that 1.6–3.3 parts by weight of $SO_3$ are present for each part by weight of phthalic acid anhydride. After this mixture is warmed to 60–75° C. a slow stream of 4 to 6, preferably, 5.2, g.-atoms of bromine and 0.5 to 3, preferably 1.1, g.-atoms of chlorine is introduced with vigorous mixing. In order to prevent chlorination of the phthalic acid anhydride supplied the introduction of the halogens is so adjusted that a slight excess of the bromine over chlorine is always present in the reaction mixture. Upon introduction of the halogens the temperature of the reaction mixture is slowly and continuously raised to 240–260° C., preferably 250° C.

In order to accelerate the conversion it can be advantageous to add bromination catalysts to the starting mixture of phthalic acid anhydride and $SO_3$ containing sulfuric acid. For example, the addition of small quantities of iodine and iron powder, for instance, about 0.023 part by weight of iodine and about 0.006 part by weight of iron powder, has proved very effective.

After completion of the reaction the reaction mixture is cooled down to room temperature to precipitate out the tetrabromo phthalic acid anhydride produced. Preferably, such cooling is as slow as practicable in order to permit larger crystals of such product to form. The precipitated product is then separated from the mother liquor by filtering on a suction filter or centrifuging and washed consecutively with concentrated sulfuric acid, dilute sulfuric acid and finally with a methanol-water mixture and subsequently dried. The product which is thus obtained in good yields is sufficiently pure for most technical uses. It melts at 270–275° C. In addition to 68% of bromine (theoretical=68.9%) it only contains slight quantities of chlorine.

In comparison with the previously known processes carried out at atmospheric pressure for the bromination of phthalic acid anhydride, the process according to the invention not only can be carried out in a considerably shorter period of time but also with substantially more complete utilization of the bromine supplied. As a consequence of the latter it is not necessary to carry out the technically very difficult recovery of HBr from the $SO_2$ and $H_2SO_4$ containing exhaust gases which was necessary with the previously known processes operating under normal pressure.

The following examples will serve to illustrate the invention with reference to several embodiment thereof.

*Example 1*

A mixture of 2200 g. concentrated sulfuric acid containing 45% $SO_3$ and 350 g. (2.36 mol) of phthalic acid anhydride, after addition of 8 g. of iodine and 2 g. of iron powder, was heated to 75° C. Then 313 cc. (12.4 g.-atom) of bromine were added dropwise over a period of 20 hours during about the first 17 of which the temperature was gradually raised to 200° C. and such temperature maintained during the last three hours. Simultaneously with the addition of the bromine, 32 liters (3 g.-atoms) of chlorine were also introduced in such a manner that a little more bromine than chlorine was always present in the reaction mixture.

The reaction mixture was then cooled off slowly to room temperature and the resulting precipitate of tetrabromo phthalic acid anhydride filtered off from the mother liquor on a suction filter. The precipitate was washed consecutively with concentrated $H_2SO_4$, dilute $H_2SO_4$ and with a water-methanol mixture and then dried. The yield was 1002 g. of tetrabromo phthalic acid anhydride (92.5% of the theoretical) containing 68.3% of bromine and 0.6% of chlorine. Its melting point was 273–274° C.

*Example 2*

A mixture of 2200 g. of concentrated sulfuric acid containing 45% of $SO_3$ and 350 g. (2.36 mol) of phthalic acid anhydride were preheated to 75° C. after the addition of 8 g. of iodine and 2 g. of iron powder. Thereafter, 265 cc. (10.4 g.-atom) of bromine were added dropwise while the mixture was slowly heated to 250° C. over a period of about 17 hours and then maintained at this temperature another 3 hours. Simultaneously with the addition of the bromine, 16 liters (1.5 g.-atoms) of chlorine were also introduced in such a manner that a little more bromine than chlorine was always present in the reaction mixture. The reaction mixture was then processed as in Example 1 for the recovery of the tetrabromo phthalic acid anhydride produced. The yield was 1051 g. (96% of the theoretical) of chlorine free tetrabromo phthalic acid anhydride containing 68.8% of bromine with a melting point of 278–279° C.

I claim:

1. In a process for the production of tetrabromo phthalic acid anhydride by bromination of phthalic acid anhydride with bromine at atmospheric pressure at elevated temperatures in concentrated sulfuric acid containing 20 to 65% of $SO_3$ as the reaction medium, the step which comprises simultaneously introducing into the phthalic acid anhydride containing reaction medium 4 to 6 g.-atoms of bromine and 0.5 to 3.0 g.-atoms of chlorine per mol of phthalic acid anhydride while maintaining a slight excess of bromine over the chlorine during the entire bromination reaction.

2. The process of claim 1 in which the reaction medium is heated slowly to 240–260° C. while the bromine and chlorine are introduced therein.

3. The process of claim 1 in which the quantities of bromine and chlorine introduced into the reaction medium per mol of phthalic acid anhydride respectively are about 5.2 g.-atoms and 1.1 g.-atoms.

4. The process of claim 1 in which 1.6 to 3.3 parts by weight of $SO_3$ are provided in such reaction medium for each part by weight of phthalic anhydride and such reaction medium is heated to 60–75° C. before the introduction of the bromine and chlorine and such reaction medium is slowly heated to 240–260° C. while the chlorine and bromine are introduced therein.

References Cited by the Examiner

UNITED STATES PATENTS 2,971,960  2/61  Waugh et al. _____ 260—309.5
3,012,035  12/61  Knowles et al. _____ 260—256.4

OTHER REFERENCES

De La Mare Aromatic Substitution (Academic Press, Inc., 1959) pages 126–8.

Guthke (German Auslegescrift) 1,039,052, 9/58.

Latimer et al.: Reference Book of Inorganic Chemistry (1940), pages 155–157.

Pratt et al.: Jour. Amer. Chem. Soc., volume 40 (1918) at page 1416.

NICHOLAS S. RIZZO, *Primary Examiner*.

IRVING MARCUS, DUVAL T. McCUTCHEN, WALTER A. MODANCE, *Examiners*.